US007453574B2

(12) United States Patent
Blakey

(10) Patent No.: US 7,453,574 B2
(45) Date of Patent: Nov. 18, 2008

(54) SYSTEM AND METHOD FOR FINDING INTEGER SOLUTIONS

(75) Inventor: Edward W. Blakey, Bournemouth (GB)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 11/619,284

(22) Filed: Jan. 3, 2007

(65) Prior Publication Data

US 2007/0165313 A1 Jul. 19, 2007

(30) Foreign Application Priority Data

Jan. 4, 2006 (GB) ................................ 0600036.8

(51) Int. Cl.
*G01B 9/02* (2006.01)

(52) U.S. Cl. ........................................ 356/450

(58) Field of Classification Search ................. 356/450, 356/33

See application file for complete search history.

(56) References Cited

U.S. PATENT DOCUMENTS 4,759,628 A * 7/1988 Tatsuno et al. .............. 356/489
5,543,916 A * 8/1996 Kachanov .................. 356/451

* cited by examiner

*Primary Examiner*—Tarifur R Chowdhury
*Assistant Examiner*—Michael Lapage
(74) *Attorney, Agent, or Firm*—Lieberman & Brandsdorfer, LLC

(57) ABSTRACT

A system and a method for finding integer solutions of equations whose graphs are conic sections. The system provides a physical implementation of a geometric formulation of integer solutions of conic sections. The system includes a first source of waves and an arrangement of a plurality of reflectors to provide a lattice of interference patterns of standing waves in a plane, the lattice representing intersections at integer values. The system also includes a second source of waves and a detector provided along a curve that, with the second source, defines a cone of waves, which intersects with the plane of the lattice to provide a conic section. The detector finds points of intersection of the lattice and the conic section to determine integer solutions of the conic section. The conic section may be y=N/x, in which case the integer solutions provide a factorization into integers of N.

17 Claims, 6 Drawing Sheets

SYSTEM AND METHOD FOR FINDING INTEGER SOLUTIONS

BACKGROUND OF THE INVENTION

1. Technical Field

This invention relates to the field of finding integer solutions of equations whose graphs are conic sections.

2. Description of the Prior Art

Integer solutions are required to equations whose graphs are conic sections or parts thereof. Conic sections are parabolas, hyperbolae, circles or ellipses. Factorization is the most obviously useful such context and is chosen for illustration. Factorization is the task of, given an integer N, finding the (unique) primes whose product is N.

The task of factorization of a given integer is notoriously difficult, to the extent of rendering computationally infeasible the extraction of factors of numbers beyond a certain size. This infeasibility is what makes some cryptographic systems secure; for example, RSA cryptography.

There are many existing algorithms to perform the task of factorization, but each suffers from an increase in computation time as the input integer increases. This increase in computation time suffered by existing algorithms is inherent in tacit assumptions made about the model of computation in which these algorithms run. Crucially, it is assumed that instructions must be executed sequentially and this seems to be responsible for the algorithms' computational complexity.

An exception to this assumption of sequential execution is a factorization algorithm run in a quantum computing environment, where parallel execution of commands avoids the calculation time problem. However, technological limitations tightly constrain the input values able to be factorized.

It is an aim of the present invention to provide a fast method of finding integer solutions of conic equations. One embodiment of this provides a fast method of factorization. Just as with traditional algorithms, there is a limit to the size of numbers that can be factorized; however, in contrast with traditional algorithms, the proposed solution suffers no increase in calculation time as the input number approaches this limit.

SUMMARY OF THE INVENTION

The invention described exploits a physical implementation of a geometric formulation of the problem of factorization. This allows factors of numbers within the allowed range to be read off (or primarily guaranteed) instantly.

In one aspect of the present invention there is provided a system for providing a physical implementation of a geometric formulation of integer solutions of conic sections. A first source of waves is provided. An arrangement of a plurality of reflectors provides a lattice of interference patterns of the first source of waves in a plane. The lattice represents intersections at integer values. A second source of waves is provided. In addition, a detector is provided along a curve that, with the second source, defines a cone that intersects with the plane of the lattice to provide a conic section, and detects points of intersection of the lattice and the conic section to determine integer solutions of the conic section. In one embodiment, the first source of waves is a source of transverse waves in order that the waves of the lattice interfere at the points of intersection with the waves from the second (cone) source.

In another aspect of the present invention there is provided a method of providing geometric formulation of integer solutions of conic sections. A lattice of interference patterns of standing waves in a plane is provided. The lattice represents intersections at integer values. A cone of waves is provided. A conic section is provided by intersecting the cone of waves with the plane of the lattice. Points of intersection of the lattice and the conic section are detected to determine integer solutions of the conic section.

Other feature and advantage of this invention will become apparent form the following description of the presently preferred embodiments of the invention, taken in conjunction with the accompanying drawings.

BRIEF DESCRIPTION OF THE DRAWINGS

Embodiments of the present invention will now be described, by way of examples only, with reference to the accompanying drawings in which.

DESCRIPTION OF THE PREFERRED EMBODIMENT(S)

Figure 1:
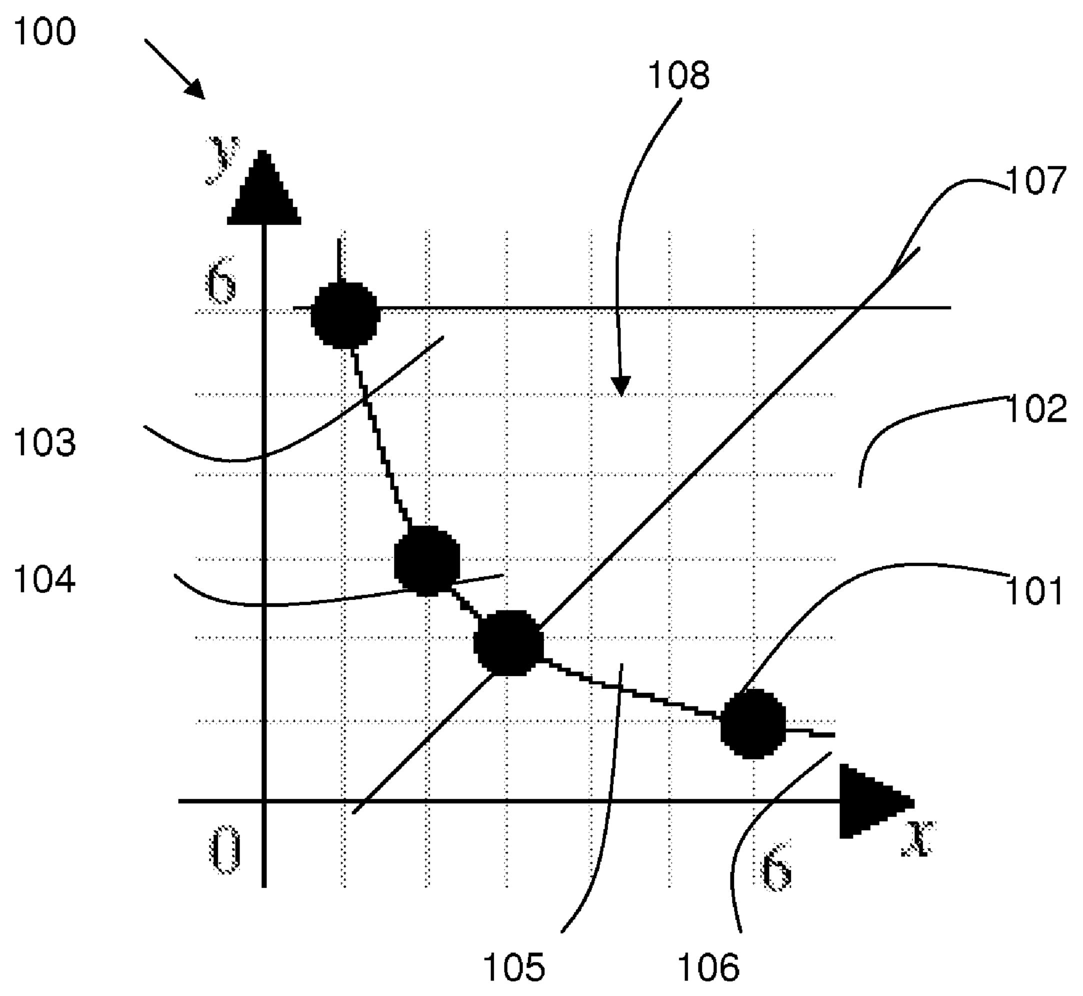
FIG. 1 is a graph illustrating factorization of an integer by representation as a curve with intersections in an integer grid in accordance with the present invention.

The described system physically implements a geometric formulation of the task of finding integer solutions to conic equations, including the task of factorization.

The geometric formulation for factorization is based on the fact that finding a pair (a,b) of factors of a given integer N (such that ab=N) is equivalent to locating a point (a,b) that lies both on the curve y=N/x and in the lattice of points whose coordinates are both integers. That the point is on the curve ensures that ab=N, and that it is in the lattice ensures that the factorization is into integers. The curve alone would give desired solutions (12=6×2, for example), but also an infinite number of non-integer solutions (12=(9/2)×(8/3), for example).

The task of finding factors of a given natural number N is equivalent to that of finding points that lie both in the integer lattice Z×Z (that is, the lattice of points (a,b) where a and b are both integers) and on the curve y=N/x.

A point (a,b) is on the curve y=N/x if and only if N=ab; it is in the lattice Z×Z if and only if a,b∈Z. Hence (a,b) is both on the curve and in the lattice if and only if a and b offer a factorization into integers of N.

Since, by hypothesis, N is positive, the curve y=N/x exists only in quadrants x,y≧0 and x,y≦0. Further, since only positive factors of N (specifically, primes) are sought, only the former quadrant need be considered, namely quadrant x,y≧0.

Similarly, by the symmetry of the curve and of the lattice (specifically because each is symmetric about the line y=x), only one octant within this quadrant need be considered (since (a,b) is both on the curve and in the lattice if and only if (b,a) is, and both points correspond to the same factorization of N due to commutativity of multiplication). Accordingly, only the octant 0≦x≦y is considered.

In three-dimensional space, the curve y=N/x, z=0 can be expressed as the intersection of the x,y-plane and a cone. This is exploited by the physical implementation of the proposed system.

The physical implementation of the lattice relies on a system of standing waves set up by reflectors and a wave source. The lattice results from the interference pattern so generated, and the regularity of the lattice spacing stems from the fixed wavelength of the source. Transverse waves are required for the lattice to ensure that the interference pattern of the waves is not limited to the x,y-plane.

The technology used to implement the idea may be one of various types. In a first embodiment, electromagnetic waves are used with reflectors in the form of mirrors. In a second embodiment, the lattice is generated by forming interference waves on the surface of a liquid with reflectors in the form of solid walls in the liquid.

Other forms of waves may also be used and each choice may have its own advantages and disadvantages in terms of computable range, size of apparatus, etc.

The implementation of the curve exploits the fact that the curve is a conic section. The curve can thus be expressed as the intersection of the lattice's plane and a certain cone. In the first embodiment, the cone, as well as the lattice, is constructed from electromagnetic waves. In the second embodiment, the cone is constructed from visible light, which shines through the lattice formed of waves in the liquid. The way in which the lattice interferes with the cone allows points of intersection to be identified.

As y=N/x is an example of a hyperbola, and hence of a conic section, the interference of the lattice and the cone enables integer solutions of the equation, i.e. factors of N, to be found. Entering the input value to be factorized is done by way of altering the lattice source's wavelength (e.g. with a variable resistor) and the position of the cone. In other words, N may be varied by varying the wavelength of the waves, the position of a source of the waves forming the cone, and the position of a detector for detecting point of intersection.

Referring to FIG. 1, the task of factorizing a given natural number N has an equivalent, geometric formulation. Consider the graph y=N/x; in particular, consider the part of the graph where both x and y are positive as shown in FIG. 1. The quadrant (100) of the graph where both x and y are positive is shown, with the curve y=N/x 101 shown. An integer lattice (102) is shown in the form of intersections of a grid. Points (103), (104), (105), (106) shown as black dots both on the curve (101) and in the lattice (102) offer a factorization of N.

By the definition of the graph, each point (x,y) on this curve (101), and none off the curve, satisfies xy=N. Any such point whose coordinates are integers, then, gives rise to a factorization of N, where the factors are the coordinates x and y. Of interest, then, are the points both on the curve (101) and in the integer lattice (102) (i.e. the lattice of points whose coordinates are both integers—in fact, both positive integers, since only this quadrant of the graph is considered).

It is noted that both the curve (101) and the lattice (102) are symmetrical about the line x=y (107), so only one half of the curve (the proposal uses that with x≦y) need be considered. Any point of interest (a,b) in the rejected half has a partner (b,a) in the considered half. Further, the lattice has, by definition, no points in the strip 0<x<1, so only the triangular region 1≦x≦y≦N need be considered. However, for ease of implementation, all of the region 0≦x≦y≦N (108) is considered.

In FIG. 1, N=6 and points (1,6) (103), (2,3) (104), (3,2) (105), and (6,1) (106) are located on both the curve (101) and the integer lattice (102). As only region (108) is considered, of specific interest are points (1,6) (103) and (2,3) (104). The coordinates of these points (103), (104) offer a factorization of N (i.e. for N=6, factors=1, 2, 3, 6).

The factorization of N corresponding to a point in the lattice and on the curve is not necessarily a full decomposition of N into primes (it may even be no more informative than to demonstrate that N=1. N). However, each prime factor p of N has a corresponding point $$\left(p, \frac{N}{p}\right)$$

in the lattice and on the curve; thus, all prime factors are represented by at fewest one such point each.

One embodiment of the system is now described using electromagnetic waves. A physical implementation of the lattice using electromagnetic waves is described with reference to FIGS. 2A and 2B. Unless stated otherwise, components described are in the x,y-plane with a z-coordinate of zero.

a) Let N be the natural number to be factorized. Assume that N is odd.
b) Let ϵ be a small, positive, fixed real (0<ϵ<<1).
c) Let M1 be a parabolic mirror (201), reflective on the concave side of the curve:

$$\left\{\left(x, -\frac{1}{2(1+\varepsilon)}x^2 + x + (1+\varepsilon), 0\right) \middle| \, 0 \le x \le 1\right\}$$

d) Let M2 be a plane mirror (202), reflective on the x<y side of: {(x,x,0)|0≦x≦1}
e) Let M3 be a plane mirror (203), reflective on the x>0 side of: {(0,y,0)|0≦y≦1}
f) Let S be a source (204) at (1+ϵ, 1+ϵ) of electromagnetic radiation with wavelength λ:=2/N.

Note that S (204) lies at the focus of the parabola of which M1 (201) is part. Suppose that S 204 is shielded such that its radiation stays within the plane z=0.

g) Let B be a triangular blackbody (205) that absorbs radiation arriving from S.

B:={(x,y,0)|1≦x≦y≦1+ϵ}

It is assumed that the number N to be factorized is odd. Should a factorization be required of an even number, it is computationally trivial to divide iteratively by two until an odd number is obtained. This is because, for ease of implementation, the reduced lattice $$\left\{(a, b) \,|\, a, b, \frac{a+b}{2} \in Z\right\}$$

(that is, pairs (a,b) of integers where the parity of a is that of b) is implemented instead of the full lattice Z×Z={(a,b)|a, b∈Z}. Any factorization of N (which is odd) into integers a and b will be such that a and b are both odd, so this reduced lattice suffices.

Further, consideration need be made only of that part of the reduced lattice with 0≦x≦y≦N (since no factor of N is greater than N); only this part of the lattice is implemented.

Radiation incident on M1 from S is reflected by M1 as a beam of waves parallel to the y-axis, in the band 0≦x≦1 (which is entirely spanned by such waves), and travelling in the direction of decreasing y.

Radiation from S not incident on M1 is not of interest here; it is either absorbed by B or completely leaves the apparatus.

The beam of waves parallel to the y-axis is reflected by M2 to form a beam parallel to the x-axis, in the band 0≦y≦1 (which is entirely spanned by the reflected beam), and travelling in the direction of decreasing x.

Radiation incident on M3 from S (via M1 and M2) is reflected by M3 back along itself, producing a standing wave.

A ray from S that is of interest (that is, that falls on mirror M1 rather than leaving the apparatus or hitting B) meets M1 at $$\left(a, -\frac{1}{2(1+\varepsilon)}a^2 + a + (1+\varepsilon), 0\right)$$

for some 0≦a≦1 (conversely, each such a has a corresponding ray). It is then reflected by M1 vertically down to (a,a,0), where M2 reflects it horizontally across to (0,a,0). M3 then reflects the ray back along itself via M2 and M1 to S, setting up a standing wave.

In the triangular region R:={(x,y,0)|0≦x≦y≦1}, the interference pattern produced by the standing waves mentioned above is such that a point (a,b,0) is at maximum amplitude (specifically, four times the amplitude of the original radiation from S) if and only if Na and Nb are integers of the same parity.

Since S is at the focus of the parabola containing M1, a beam of waves parallel to the x-axis and in the band 0≦x≦1 is reflected from M1, which is then reflected from M2 so as to be parallel to the y-axis and in the band 0≦y≦1, and then reflected back along itself by M3. This sets up a standing wave with points of inactivity separated by distances of 1/N, and points of activity with twice the amplitude of source S in between. In its horizontal component, the standing wave interferes with other such standing waves (in their vertical components), to produce a lattice of points of maximum amplitude (namely four times that of the wave from S) within the region R:={(x,y)|0≦x≦y≦1}; the set of these points is LN:={(x,y) in R|Nx and Ny are integers of the same parity}. Region R is shown as the shaded region (206) in FIGS. 2A and 2B.

Figure 2A:
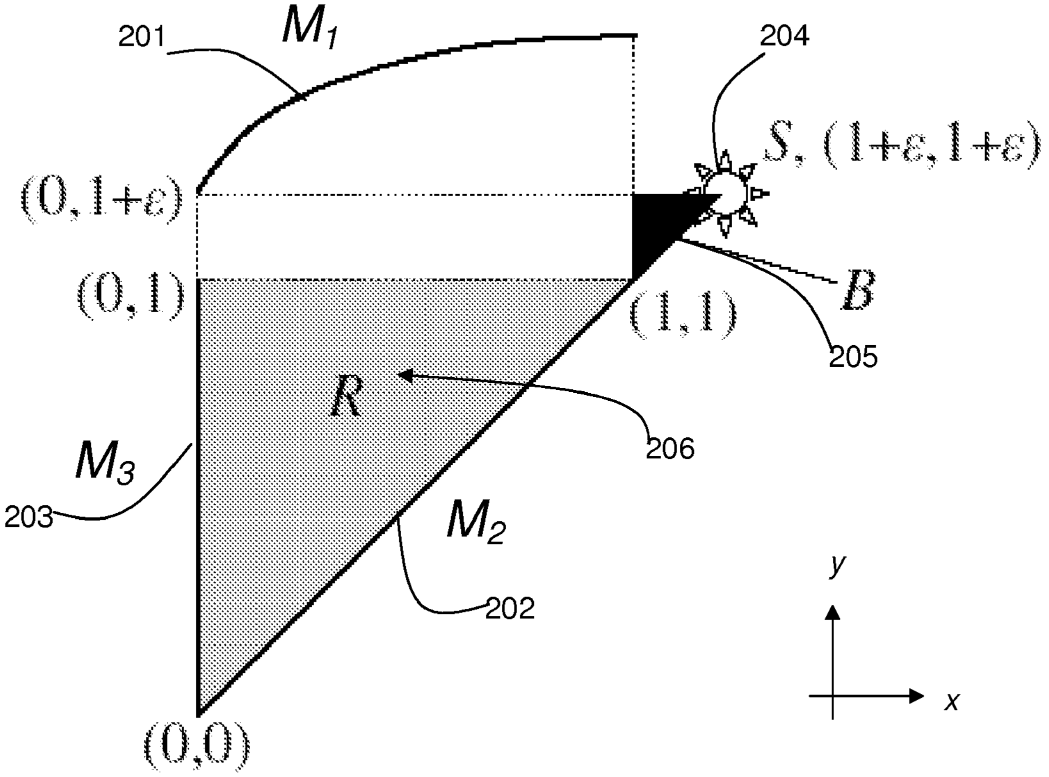
FIGS. 2A and 2B are figures illustrating the implementation of the provision of a lattice in accordance with the present invention.
Figure 2B:
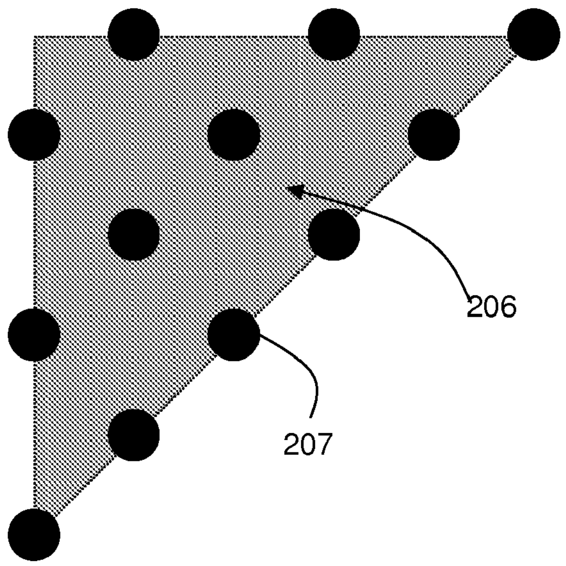

LN is the implementation of the integer lattice as shown in FIG. 2B. Note, then, that a point (a,b) in the geometric formulation corresponds to the point (a/N,b/N) in the physical implementation. This conversion is necessary if the apparatus described is to maintain its structure regardless of the choice of N. FIG. 2B shows N=5 with LN shown as black dots (207) in the context of R (206) shown as the shaded triangle.

Figure 3:
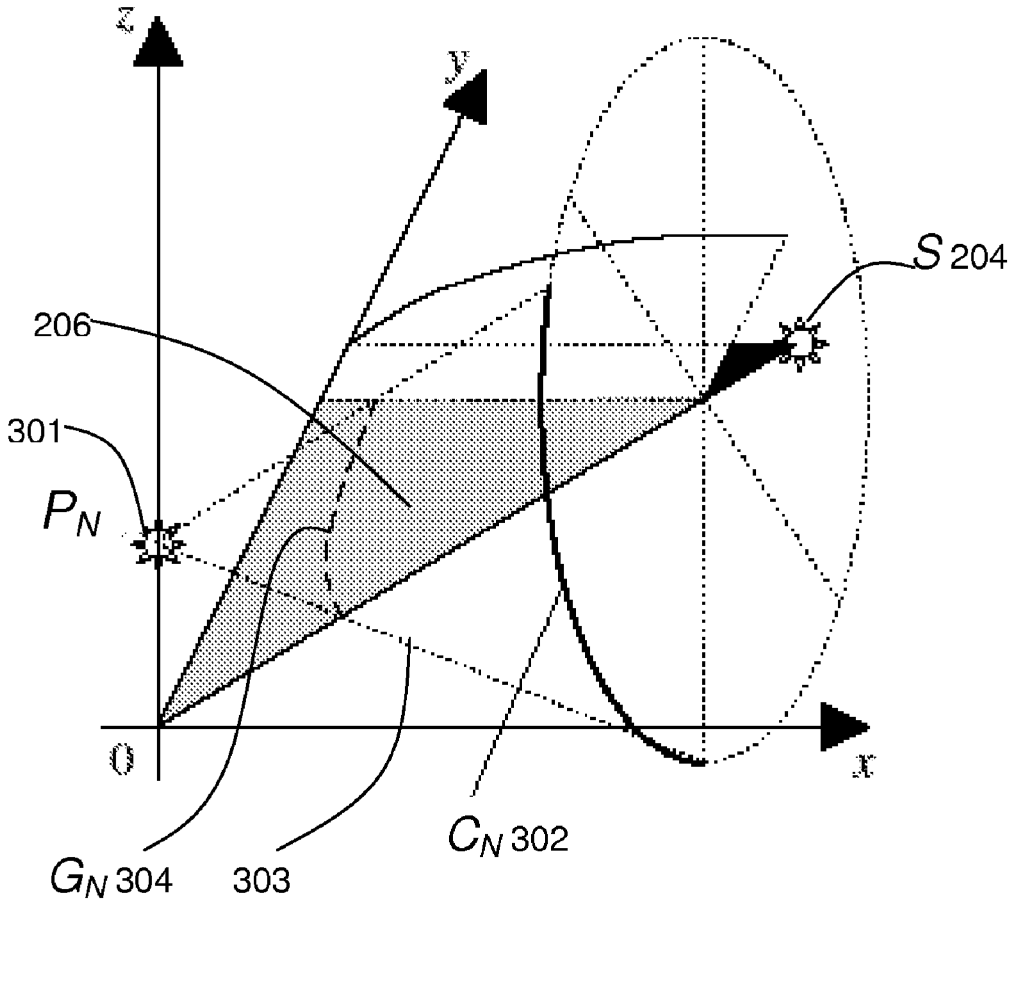
FIG. 3 is a figure illustrating the implementation of the provision of the curve in accordance with the present invention.

Physical implementation of the curve y=N/x using electromagnetic waves is provided with reference to FIG. 3.

a) Let PN be a source (301) at $$\left(0, 0, \sqrt{\frac{2}{N}}\right)$$

of electromagnetic radiation.

b) Let CN be a detector (302) along the curve $$\left\{(x, 2-x, z) \,\middle|\, 2(x-1)^2 + \left(z - \sqrt{\frac{2}{N}}\right)^2 = 2 \wedge z \le \frac{1-N}{1+N}\sqrt{\frac{2}{N}} \wedge 2 - x \ge 1\right\}$$

CN (302) is the circular arc produced by projecting $$G_N := \left\{(x, y, 0) \in R \,\middle|\, \frac{1}{xy} = N\right\}(304)$$

onto the plane y=2−x from PN (301). Hence, radiation arriving from PN at a point on CN passes through the plane z=0 at a point (x,y,0) such that 1/xy=N.

Then the cone (303) with tip PN (301) and curved surface passing through the circle containing CN (302) is that which, in conjunction with R, describes the curve GN.

The reading of results is as follows. The radiation arriving from PN (301) at a point on CN (302) will be weakest where the point (x,y,0) of R (206) through which it passed offers a factorization of N (in that (1/x)(1/y)=N), since such points (x,y,0) display high-amplitude interference because of the standing wave from S (204). Thus, a prime p can be recognized as such by its having only one pair of factors (itself and one), and hence only one weak point on CN (302). A composite number N will have further pairs of weak points, as described above.

It is a matter of simple geometry to convert the coordinates of such a point on the sensor via those of a point on the implementation of the curve into a factorization of N.

As a by-product of this, primes within the computable range can be identified quickly. N can be changed continuously (via continuous alteration of λ and repositioning of PN and CN)—when not an integer, no factors will be displayed. Primes can be easily identified: each has only one high-amplitude interference (i.e. weak) point.

Radiation from PN incident on a point (a,2-a,c) on CN has passed through $$\left(\sqrt{\frac{a}{N(2-a)}}, \sqrt{\frac{2-a}{Na}}, 0\right)$$

in R (206).

If the radiation from PN at (a,2-a,c) on CN displays high-amplitude interference (i.e. is weak), then $$\sqrt{\frac{Na}{2-a}} \text{ and } \sqrt{\frac{N(2-a)}{a}}$$

are factors of N; conversely, all factors of N have an analogous such point on CN.

Having set up the apparatus as described with reference to FIGS. 2A, 2B and 3, the factors of N are found. Since all factors are represented by points on CN displaying high-amplitude interference (and since there are no other such points), a value of N produces:

a) no such points if and only if N is not an integer, b) a single such point (corresponding to the factorization N=1.N ) if and only if N is prime, and c) two or more such points if and only if N is composite.

In particular, by sweeping continuously through a range of values of N (by continuously altering the wavelength of S, for example with a variable resistor, and the height (that is, z-coordinate) of PN and CN), primes can be quickly identified.

Figure 4:
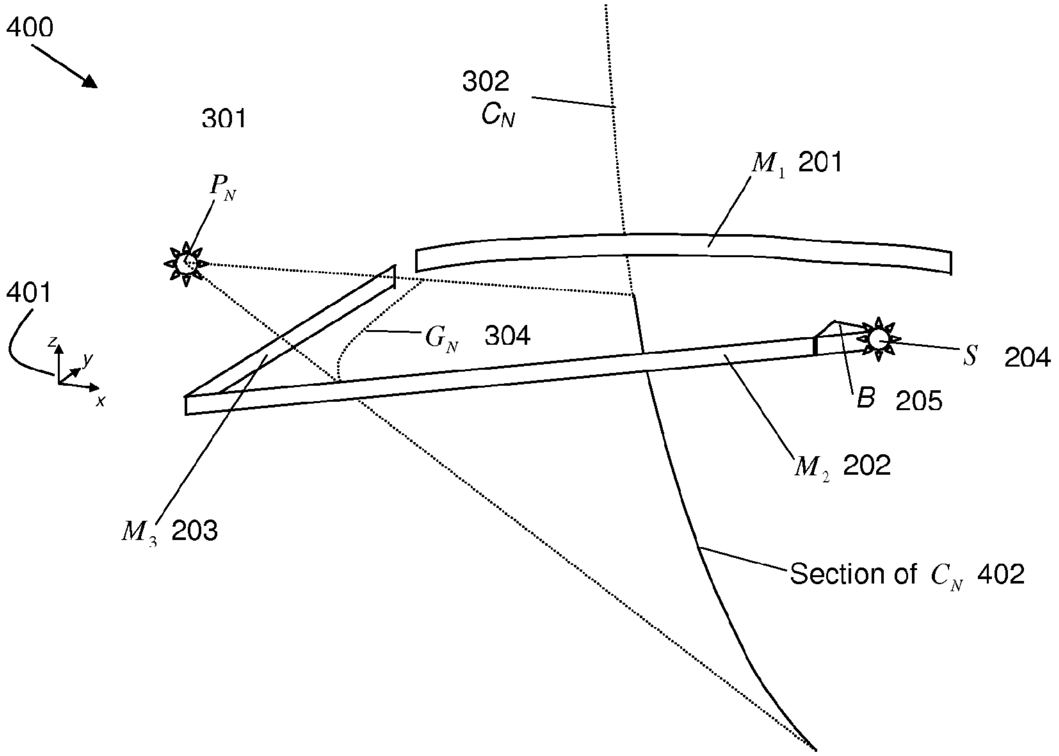
FIG. 4 is a diagram of an apparatus in accordance with the present invention.

Referring to FIG. 4, an example apparatus (400) is provided for implementing the described system in the form of electromagnetic waves. The reference numbers used in FIGS. 2A, 2B and 3 are also used in this figure for consistency.

The scale of the diagram is given by the three arrows x, y and z (401), which show the axes' directions and are each 1/10 of a unit in length. The choice of actual size of the apparatus has to balance ease of reading (which favors larger apparatus) with cost of materials and bulkiness (which favor smaller apparatus). In this example, 1 cm for each arrow may be used as an illustration (so that one unit, and hence for example the length of $M_2$, is 10 cm).

The origin (which is defined so that points can be easily described by their coordinates) is taken to be the midpoint of the line at which $M_2$ (202) and $M_3$ (203) meet.

The mirrors $M_1$ (201), $M_2$ (202), $M_3$ (203) and the black-body B (205) are shown here with a slight height (0.5 cm). In practice, this height would be as small as possible without the mirrors becoming too weak. The smaller the height can be made, the larger N can be.

In FIG. 4, the reflective sides of mirrors $M_1$ (201) and $M_3$ (203) are facing and the reflective side of mirror $M_2$ (202) is away.

$\epsilon$ is taken to be 0.1.

A section of CN is used as a detector depending on N. In the example shown in FIG. 4, a detector (402) is provided at a section of CN shown when N=15.

The value of N can be changed. FIG. 4 shows the example N=15; other values of N can be entered with the following two steps. The order in which the steps are executed is not important.

Step 1. The wavelength of radiation from source S (204) needs changing to 2/N units $$\left(\frac{20}{N}\text{ cm}\right).$$

Step 2. The height of $P_N$ (301) and $C_N$ (302) needs changing such that source $P_N$ (301) has z-coordinate $$\sqrt{\frac{2}{N}}$$

units $$\left(\sqrt{\frac{200}{N}}\text{ cm}\right),$$

as does the centre of the circle of which detector $C_N$ (302) is part.

On completion of step 1, the interference pattern that implements the integer lattice is produced in the triangle between $M_2$ (202) and $M_3$ (203).

On completion of step 2, radiation reaching $C_N$ (302) from $P_N$ (301) will have passed through $G_N$ (304) (which is the implementation of the graph $$y=\frac{N}{x}).$$

The results are read from the apparatus as follows. The points on $C_N$ (302) where radiation from $P_N$ (301) is weakest are those corresponding to pairs of factors of N. If such a point has an x-coordinate of a units (that is, 10a cm), then $$\sqrt{\frac{Na}{2-a}}$$

and $$\sqrt{\frac{N(2-a)}{a}}$$

are factors of N. Calculating these two values for all such a will yield all factors, prime or otherwise, of N.

Figure 5:
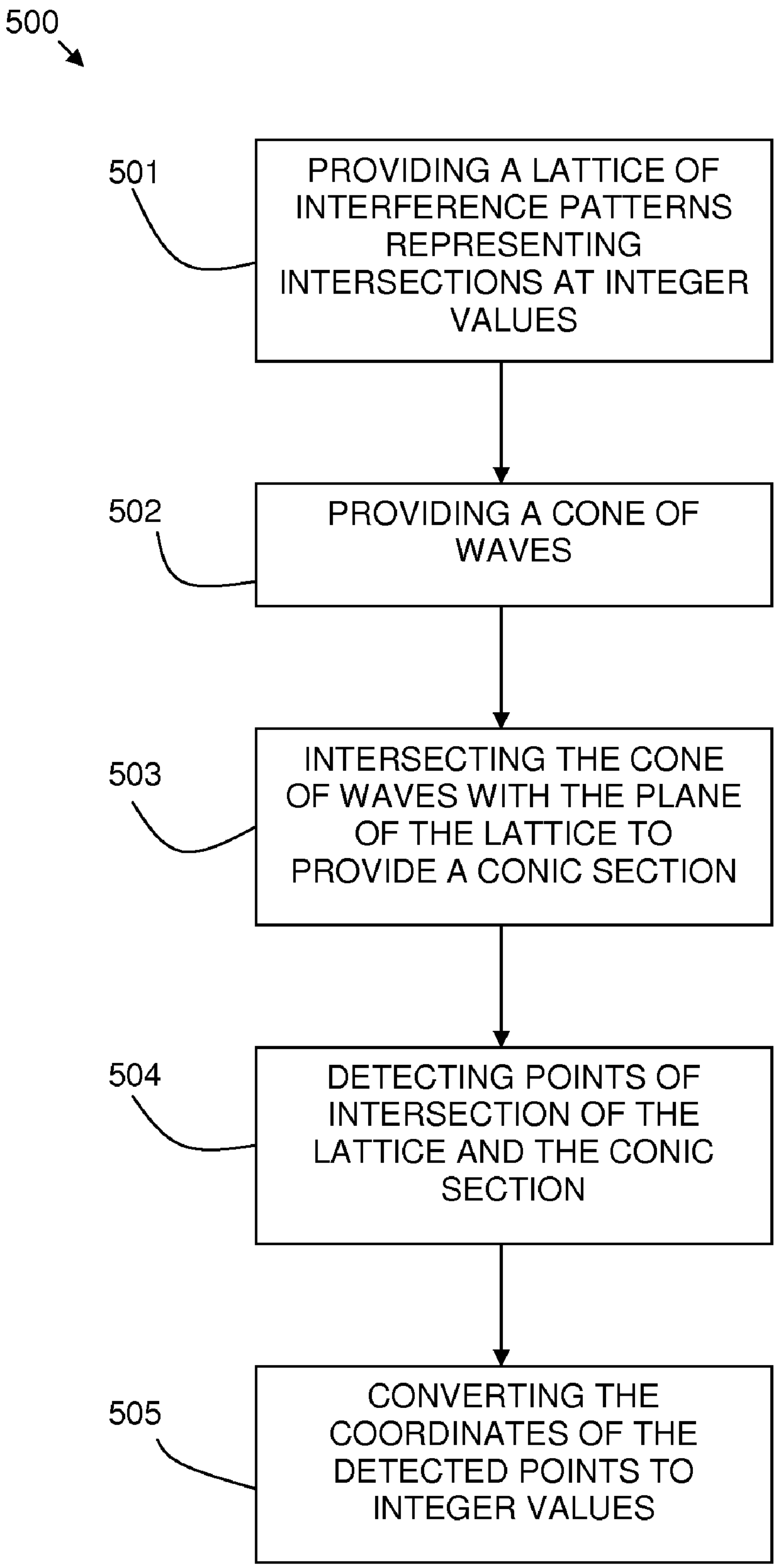
FIG. 5 is a flow diagram of a method of providing a geometric formulation of integer solutions of conic sections in accordance with the present invention.

Referring to FIG. 5, a flow diagram (500) is provided showing the method of providing a geometric formulation of integer solutions of conic sections. A lattice is provided (501) of interference patterns of standing waves in a plane, the lattice representing intersections at integer values. A cone of waves is provided (502) and the cone of waves is intersected with the plane of the lattice to provide a conic section (503). Points of intersection of the lattice and the conic section are detected (504). The coordinates of the detected points are converted (505) to points in the geometric formulation.

Figure 6:
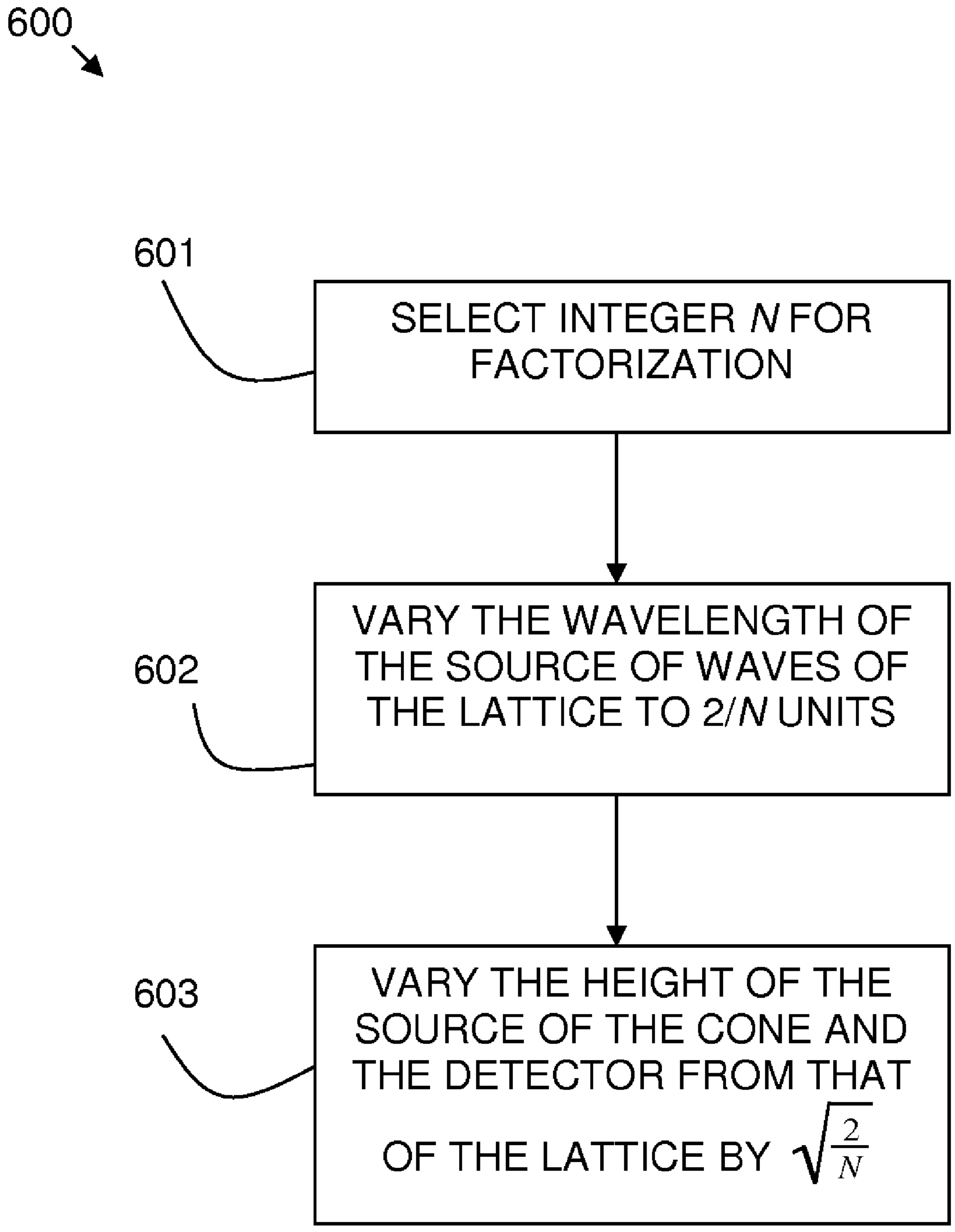
FIG. 6 is a flow diagram of a method of factorization in accordance with the present invention.

Referring to FIG. 6, a flow diagram (600) is provided showing the method of factorization. An integer N is selected (601). The wavelength of the source of waves of the lattice is varied to 2/N units (602). The height of the source of the cone and the detector are varied (603) in a direction perpendicular to the plane of the lattice so as to be distant from this plane by $$\sqrt{\frac{2}{N}}$$

units, where a unit is defined as a unit of length for the system. Steps (602) and (603) can be carried out in either order.

Alternative Embodiments

It will be appreciated that, although specific embodiments of the invention have been described herein for purposes of illustration, various modifications may be made without departing from the spirit and scope of the invention. In particular, the described system is provided using non-electromagnetic waves. This embodiment illustrates that it is not necessary that the two sources S and $P_N$ be of the same type.

The requirements are:

(1) that S produce transverse waves (else the wave activity that simulates the lattice would be confined to the x,y-plane, and would not in particular interfere with radiation going from $P_N$ to $C_N$); and (2) that radiation from $P_N$ be affected by the interference pattern from S in such a way that presence of interference can be distinguished at $C_N$ from absence.

In this embodiment, source S makes waves of the required wavelength on the surface of a liquid (by beating the surface with the required frequency). Reflectors are provided by solid walls in the liquid. $P_N$ is a source of visible light, which shines into the liquid. A submerged sensor $C_N$ (suitably positioned to allow for refraction) sees either steady light (indicating no lattice wave activity) or on-off light (indicating lattice wave activity, which refracts to varying degrees the light from $P_N$, thus making it only occasionally hit $C_N$); the latter corresponds to weak radiation arriving at $C_N$ in the first embodiment.

It is clear that in both described embodiments of the system, by repositioning PN and CN so as to implement a different cone, a similar method allows computation of integer solutions of different conic section graphs (parabolae, hyperbolae, circles and ellipses) or parts thereof. So, while factorization is chosen for discussion because of its wide range of applications and its notoriety as a difficult problem, the task is an illustration of a larger class of problems that the general method presented here can be used to solve.

In one embodiment the first and second sources of waves are sources of electromagnetic waves, the plurality of reflectors is in the form of a plurality of mirrors, and the detector is in the form of an electromagnetic sensor. The plurality of mirrors may have a height as small as possible while maintaining sufficient physical strength. A variable resistor may be provided to vary the wavelength of the first source to scan through a range of values of wavelength.

In another embodiment, the detector may be submerged in the liquid and may detect visible light to determine points of intersection of the lattice and the conic section.

ADVANTAGES OVER THE PRIOR ART

The present proposal addresses the computational difficulty encountered when using traditional algorithms to find integer solutions to certain equations (e.g. when factorizing integers). The proposed method of factorization is qualitatively different from existing processes because it uses a direct physical implementation of the problem in preference to the standard model of computation. This allows for much improved calculation times.

The embodiments disclosed herein enables values sufficiently small may be factorized instantly. Traditional methods take longer and longer as the value increases, until a time which is deemed to be too long is surpassed. Another advantage is that, by "sweeping through" the range of sufficiently small input values, primes within this range can be quickly identified.

This ability to find primes of the same magnitude as those numbers that can be factorized means that the proposed method poses no threat to RSA or similar systems. If it is supposed that the method can reliably factorize n-digit numbers and hence decrypt information encoded with RSA using an n-digit key, then, by the proposed method, n-digit primes can be found, and, by multiplying two such, a 2n−1 digit or 2n digit RSA key can be formed.

Improvements and modifications can be made to the foregoing without departing from the scope of the present invention.

The invention claimed is:

1. A method of providing geometric formulation of integer solutions of conic sections, comprising:

providing a lattice of interference patterns of standing waves in a plane;

providing a cone of waves;

providing a conic section by intersecting the cone of waves with the plane of the lattice; and determining an integer solution of the conic section with a conic equation by detecting points of intersection of the lattice and the conic section.

2. The method of claim 1, wherein the conic section is part of the curve y=N/x and the integer solutions provide a factorization into N, where N is an integer.

3. The method of claim 2, further comprising varying N by varying a wavelength of the waves, varying a position of a source fo the waves forming the cone, and varying a position of a detector for detecting points of intersection.

4. The method of claim 2, wherein the lattice has points of inactivity separated by a distance 1/N with points of activity in between.

5. The method of claim 2, further comprising converting from points (a/N, b/N) in the physical implementation to points (a,b) in the geometric formulation, where (a,b) are a pair of factors.

6. The method of claim 2, wherein the lattice is provided in a region of $0 \leqq x \leqq y \leqq N$.

7. The method of claim 2, wherein N is odd and if a factorization of an even number is required, the method includes interatively dividing by two to obtain an odd N.

8. The method of claim 2, wherein said intersection of said lattice with said conic section at said integer values are identified by a maximum amplitude of an interference pattern produced by standing waves.

9. The method of claim 2, wherein said intersection of said lattice with said conic section at said integer values are identified by a minimum amplitude of an interference pattern produced by standing waves.

10. A method of providing geometric formulation of integer solutions of conic sections, comprising:

providing a lattice of interference patterns of standing waves in a plane, the lattice representing intersection at integer values;

providing a cone of waves;

intersecting the cone of waves with the plane of the lattice to provide a conic section; and detecting points of intersection of the lattice and the conic section to determine integer solutions of the conic section, wherein the conic section is part of the curve y=N/x and the integer solutions provide a factorization into N, where N is a integer.

11. The method of claim 10, further comprising varying N by varying a wavelength of the waves, varying a position of a source fo the waves forming the cone, and varying a position of a detector for detecting points of intersection.

12. The method of claim 10, wherein the lattice has points of inactivity separated by a distance 1/N with points of activity in between.

13. The method of claim 10, further comprising converting from points (a/N, b/N) in the physical implementation to points (a,b) in the geometric formulation, where (a,b) are a pair.

14. The method of claim 10, wherein the lattice is provided in a region of $0 \leqq x \leqq y \leqq N$.

15. The method of claim 10, wherein N is odd and if a factorization of an even number is required, the method includes interatively dividing by two to obtain an odd N.

16. The method of claim 10, wherein said intersection of said lattice with said conic section at said integer values are identified by a maximum amplitude of an interference pattern produced by standing waves.

17. The method of claim 10, wherein said intersection of said lattice with said conic section at said integer values are identified by a minimum amplitude of an interference pattern produced by standing waves.

* * * * *